Jan. 30, 1951    J. H. KIRBY, II    2,539,435
MAGNETIC FISHING TOOL
Filed May 7, 1946

JOHN H. KIRBY II
INVENTOR.

BY Lester B Clark
 Ray L. Smith
ATTORNEYS

Patented Jan. 30, 1951

2,539,435

UNITED STATES PATENT OFFICE 2,539,435

MAGNETIC FISHING TOOL

John H. Kirby, II, Houston, Tex.

Application May 7, 1946, Serial No. 667,796

6 Claims. (Cl. 294—86)

The invention relates to a magnetic fishing tool for wells thereby a piece of junk or fish in a well may be attracted, drawn into an enclosing skirt and caught so that it may be retrieved from the well.

It is one of the objects of the invention to provide a fishing tool where a magnet thereon is exposed to attract the fish and then enclosed to catch the fish.

Another object is to provide a magnet fishing tool for wells with a slidable skirt to catch the fish.

Another object is to provide a magnetic fishing tool for wells with a slidable skirt which is normally retained in retracted position to be released automatically upon the energizing of the magnet.

Still another object is to provide a magnetic fishing tool which may be filled with a suitable liquid to prevent the entrance of foreign matter until the tool is operated.

Other and further objects of the invention will be readily apparent with the following description considered with the accompanying drawings wherein.

Figure 1:
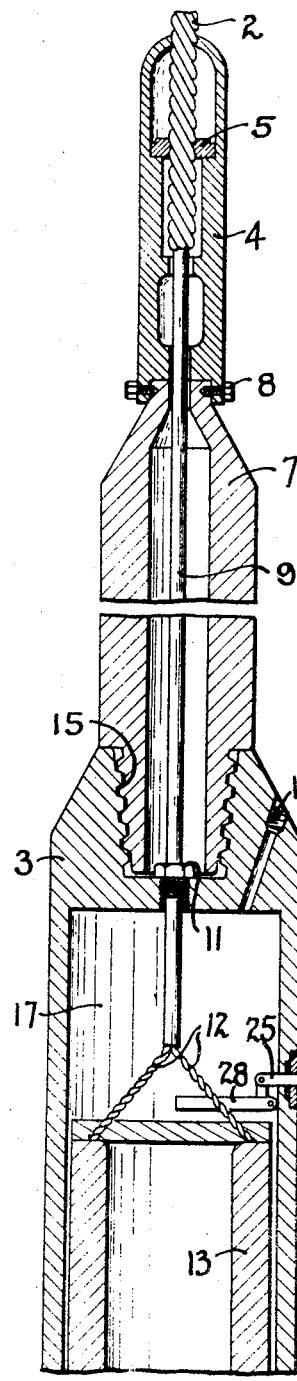
Fig. 1 is a vertical sectional view of the upper portion of the fishing tool as it is being operated to catch the fish.

In Fig. 1 the cable 2 is a combination cable having an electric conductor therein and being capable of sustaining the weight of the fishing tool 3 and any fish which may be attracted or caught thereby.

A cap 4 fits closely about the cable 2 and a sealing plate 5 therein serves to prevent the entrance of foreign matter. This cap may be removably attached to the body 7 of the tool by the screws 8. A conduit 9 extends from the cable 2 down through the cap 4, through the head 10 of the tool and into the body 3 thereof so as to protect the electric wires 12. These wires are connected to the magnet 13 so as to thus energize the magnet. The packing gland 11 seals the conduit in position.

The head 7 is threaded at 15 into the body 3 to seal the top of the body. This head is of reduced size so that it may be engaged by a suitable overshot or grapple to retrieve the tool in event the cable should break or the tool should become lodged in the well bore.

Figure 3:
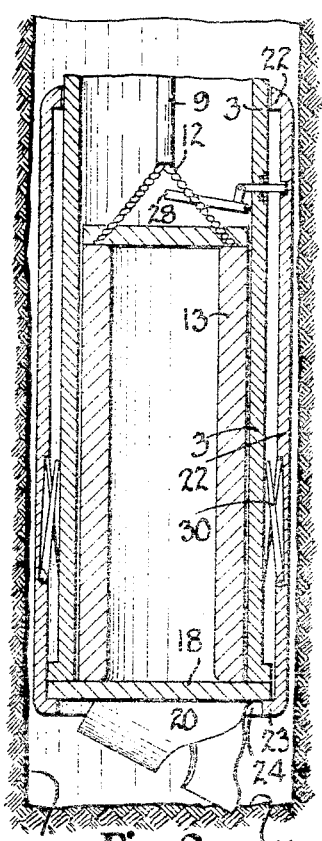
Fig. 3 is a vertical sectional view of the tool showing the parts in position as the fish is being attracted and with the skirt ready for release.

The body 3 is hollow to provide the chamber 17 in which the magnet 13 is positioned. The lower end of the magnet carries a contact plate 18 which is of a size to fit across the open end 19 of the body and provide a surface against which the fish 20 may engage as best seen in Fig. 3. The opening 16 closed by a plug may be used to fill the tool with oil or suitable liquid to prevent the entrance of foreign matter.

A skirt or retainer member 22 is slidably arranged around the lower portion of the body 3 and as the tool is lowered into the well bore will be in the position seen in Fig. 3. This skirt has an inwardly turned flange 23 thereon which defines an opening 24 so as to expose the contact plate 18 as seen in Fig. 3.

In order to retain the skirt in retracted position to expose the plate 18, a latch 25 is carried by the body in the form of a locking pin 26 slidable in the packing 27 and pivoted to an arm 28. This arm projects over the top of the magnet 13 in such a manner that it will be drawn down when the magnet is energized. This movement retracts the pin 26 from the recess 29 in the skirt 22 so as to thus release the skirt.

Figure 4:
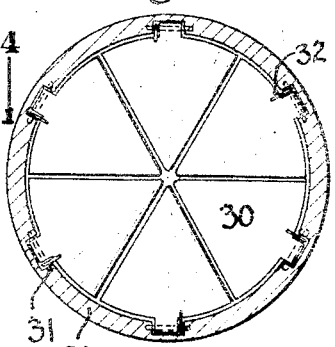
Fig. 4 is a section taken on the line 4—4 of Fig. 2.

The fish catchers or tongues 30 pivoted at 31 in the skirt 22 and urged downwardly to the position of Fig. 4 by the springs 32 are retained in retracted position by the periphery of the body 3 as seen in Fig. 3. The recesses 34 in the interior of the skirt may be provided to receive the tongues.

Fig. 3 shows the bottom end of the tool with the parts in position as they are arranged when the tool is lowered into a well bore 40 where a fish 20 reposes on the bottom 41 thereof.

The fish 20 may be any piece of equipment or material which has fallen into the well bore, broken from a tool or in any other manner become loosened and remains in the well bore. Loose pieces of junk of this sort are usually metallic and can be attracted by a magnet.

Figure 2:
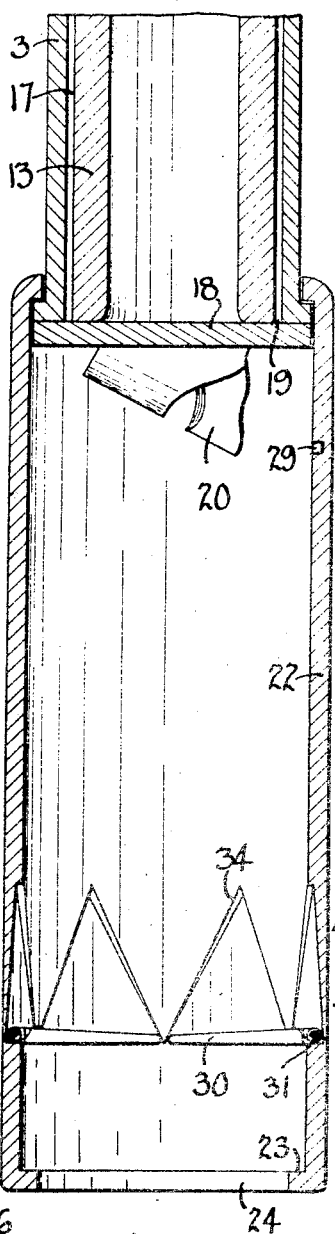
Fig. 2 is a vertical sectional view which is a continuation of the tool of Fig. 1 and showing the lower portion of the tool as having caught fish.

The fishing tool is thus lowered to the bottom of the well bore and then the current is applied to the electric circuit. Fig. 3 shows the fish being attracted to the contact plate 18 and the arm 28 about to move downward to retract the locking pin 26 from the recess 29 in the skirt 22. When the skirt is thus released an upward pull on the cable 2 raises the body 3, the magnet 13, plate 18, and the fish 20 while the weight of the skirt 22 causes it to remain on or close to the bottom. The skirt in thus dropping down or remaining stationary while the magnet moves up encloses the contact plate 18 and the fish 20 so that the parts assume the position of Figs. 1 and 2. As the tongues 30 are released they will snap down to the position of Fig. 2 to close the bottom of the skirt. The current on the magnet may now be cut off so that the magnet is deenergized. The fish 20 will now drop down onto the tongues or catchers 30 to be retained inside the skirt. The entire tool is now raised to the surface.

Broadly the invention contemplates a magnetic fishing tool which will attract, enclose and then catch the fish.

What is claimed is:

1. A fishing tool for wells comprising a hollow body, a combination support and electric cable connected to said body to raise and lower the body in the well bore, a magnet in said body connected to said cable, a fish retainer skirt slidably supported on said body so that when said magnet is energized and the body lifted the fish will be raised into said skirt.

2. A fishing tool for wells comprising a hollow body, a combination support and electric cable connected to said body to raise and lower the body in the well bore, a magnet in said body connected to said cable, a fish retainer skirt slidably supported on said body so that when said magnet is energized and the body lifted the fish will be raised into said skirt, and means in said skirt to retain the fish.

3. A fishing tool for wells comprising a hollow body, a combination support and electric cable connected to said body to raise and lower the body in the well bore, a magnet in said body connected to said cable, a fish retainer skirt slidably supported on said body so that when said magnet is energized and the body lifted the fish will be raised into said skirt, and means operable upon the energizing of said magnet to release said skirt.

4. A magnetic fishing tool including a magnet to attract the fish, a skirt slidable relative to the magnet, means energizing and means to lift said magnet so that said skirt encloses the fish, and additional means in the skirt to catch the fish when the magnet is deenergized.

5. A magnetic fishing tool including a body, a magnet therein, means including a cable to energize said magnet and manipulate said body, a skirt about said body which is slidable to enclose the lower end of said magnet, and means in the skirt to catch the fish.

6. A magnetic fishing tool including a body, a magnet therein, means including a cable to energize said magnet and manipulate the body, a skirt about said body which is slidable to enclose the lower end of said magnet, and means to latch said skirt in raised position to expose the lower end of said magnet to attract the fish.

JOHN H. KIRBY, II.

No references cited.